United States Patent Office
3,454,560
Patented July 8, 1969

3,454,560
PROCESS FOR THE PRODUCTION OF
CHONDROITIN POLYSULFATE
Kinzo Nagasawa, Bunkyo-ku, Japan, assignor to Seikagaku Kogyo Co., Ltd., Tokyo, Japan, a corporation of Japan
No Drawing. Filed Feb. 20, 1967, Ser. No. 617,076
Claims priority, application Japan, Mar. 1, 1966, 41/12,505
Int. Cl. C08b 5/14, 19/02; A61k 27/00
U.S. Cl. 260—234
5 Claims

ABSTRACT OF THE DISCLOSURE

Depolymerization and sulfation of chondroitin monosulfate by sulfuric acid. Chondroitin monosulfate is dissolved at a temperature of from −30° C. to +50° C. in a concentrated sulfuric acid having a concentration of at least 85% by weight. The temperature is kept until the desired product is formed. A sufficient amount of an aliphatic ether such as diethyl ether or tetrahydrofuran is then added to the reaction mixture to precipitate the product, which is chondroitin disulfate, trifulfate or tetrasulfate having homogeneous characteristic concerning molecular weight and sulfate group distribution.

This invention relates to a process for the producing of chondroitin polysulfate.

It is known that when chondroitin polysulfate obtained by chemically treating chondroitin monosulfate extracted from natural substance (mainly cartilages of animals) has a proper molecular weight and a proper sulfur content, it has various physiological activities, especially a heparinoid blood anticoagulant activity and a lipemia clearing activity.

Researches concerning sulfation of chondroitin monosulfate have been reported in K. H. Meyer et al.: Helv. chim. Acta, 35, 574–588 (1952) and German patent specification 968,752 (corresponding to British patent specification 704,516). The former is a report concerning heparinoid activities of various chondroitin polysulfates having various sulfur contents, wherein as sulfating agents, of chondroitin monosulfate, (i) liquid $SO_2$ and $SO_3$, (ii) liquid $SO_2$ and $ClSO_3H$, (iii) pyridine and $SO_3$, (iv) $ClSO_3H$ only, or (v) dioxane and $SO_3$ are used. The latter, discloses a process for the production of chondroitin polysulfate which comprises partially hydrolyzing chondroitin monosulfate with, for instance, hydrochloric acid to degrade the same, isolating the degraded product, subsequently sulfating said product by a process known per se, for instance, with pyridine and $ClSO_3H$.

It has been found that it is possible to simply produce chondroitin polysulfate having more excellent physiological activities and a lower toxicity from chondroitin monosulfate by a process which comprises dissolving chondroitin monosulfate or its salt in a concentrated sulfuric acid having a concentration of at least 85% by weight at a temperature within the range of from −30° C. to +50° C., maintaining the obtained solution at a temperature within said range, and recovering from the reaction mixture the desired product in the form of a free acid or its salt.

The chondroitin monosulfate used as initial material may, for example, be prepared by the method of K. H. Meyer et al. (Helv. chim. Acta, 31, 1402 (1949)). As a typical monosulfate, chondroitin-4-sulfate (called as chondroitin sulfate A) represented by a recurring unit of the formula:

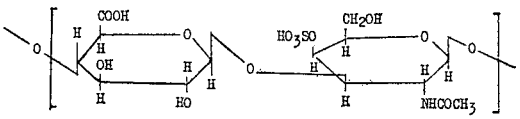

and chondroitin-6-sulfate (called as chondroitin sulfate C) represented by a recurring unit of the formula:

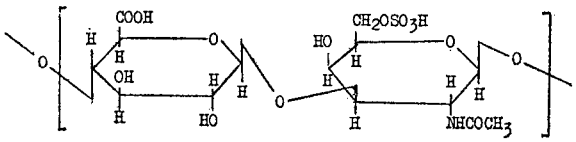

are known. In this specification and claims, chondroitin sulfate having in its sodium salt 6.6% by weight or less of sulfur content shall be referred to as "chondroitin monosulfate."

A concentrated sulfuric acid used in the process of this invention reacts directly with chondroitin monosulfate as a sulfating agent, at the same time, it serves as a solvent for the reactant and the reaction product. A concentrated sulfuric acid to be used must contain at least 85% by weight of $H_2SO_4$. The more is the water content, the lower becomes the sulfating efficiency and the depolymerization only proceeds, therefore, use of a concentrated sulfuric acid containing at least 95% by weight is advantageous. With a sulfuric acid having a concentration of below about 75% by weight, the sulfation does not substantially proceed, but the depolymerization only proceeds. A concentrated sulfuric acid used as a sulfating agent in the process of this application may also contain another sulfating agent such as $SO_3$ or $ClSO_3H$. However, even if such a reaction medium is used, what participates in the sulfating reaction of this invention is considered sulfuric acid only. The reason therefor is because it is understood that the efficiency of a sulfating reaction due to such reaction medium is substantially not different from that due to a concentrated sulfuric acid only.

Influence of the reaction temperature in this invention is essential and the influence appears in the depolymerization only. Namely, the higher is the reaction temperature, the more proceeds the depolymerization. In contrast, proceeding of sulfuric acid esterification does not seem to be affected much by the reaction temperature. The reaction temperature above 50° C. must be avoided since undesirable carbonization and decomposition of chondroitin monosulfate and the product are accelerated thereby. When sulfonation is carried out especially while inhibiting to a light degree lowering of the molecular weight, use of the reaction temperature of from −30° C. to −20° C. is preferable. In a reaction at such a low temperature, in order to maintain the reaction medium liquid, it is necessary to lower the freezing point of a concentrated sulfuric acid. For this purpose, to a concentrated sulfuric acid an aliphatic ether having up to 8 carbon atoms in a proper amount of up to 50% by weight based on the liquid reaction medium had better be added. As a suitable ether, there are acyclic aliphatic ethers such as diethyl ether, diisopropyl ether, di-n-propyl ether, and ethylene glycol dimethyl ether, and cyclic aliphatic ethers such as tetrahydrofuran and dioxane.

For instance, when chondroitin-6-sulfate (average molecular weight: 67,200) is reacted with a concentrated sulfuric acid at a temperature of from −6° C. to −7° C.

for 2 hours, the result is that two fractions each having a sulfur content corresponding to the chondroitin disulfate and an average molecular weight of about 10,000 and 4,000, respectively are produced. In contrast, when chondroitin-6-sulfate is reacted in a concentrated sulfuric acid containing 14% of tetrahydrofuran at −30° C. for the same period, one fraction having a sulfur content corresponding to the chondroitin disulfate and an average molecular weight of about 50,000 is produced.

Influence of the reaction period in this invention appears in degradation and degree of sulfuric acid esterification. Namely in a process wherein chondroitin monosulfate is added to a concentrated sulfuric acid and dissolved while uniformly dispersing, it appears the primary sulfuric acid esterification and lowering of the molecular weight proceed, thereafter as time goes by the secondary sulfuric acid esterification and lowering of the molecular weight proceed. For instance, when chondroitin monosulfate (average molecular weight: 67,200) is reacted with a concentrated sulfuric acid, after 1 hour has elapsed at a reaction temperature of 4–5° C. the reaction products of two fractions each having a sulfur content corresponding to the chondroitin disulfate and average molecular weights of 7,000 and 3,400, respectively are produced, whereas after 4 hours have elapsed a reaction product having a sulfur content corresponding to the chondroititn tetrasulfate and an average molecular weight of 2,200 is produced. Namely, the reaction period affects both sulfuric acid esterification and lowering of the molecular weight, especially it remarkably affects proceeding of sulfuric acid esterification.

After completion of the reaction, it is very important to efficiently separate the desired product from the reaction mixture. It has been found that when a sufficient amount of an aliphatic ether containing up to 8 carbon atoms is added to the reaction mixture while it is being cooled, the desired product precipitates as a free ester almost quantitatively. As a suitable aliphatic ether, there may be cited what is illustrated above as a freezing point lowering agent for a concentrated sulfuric acid. For instance, by filtering by a glass filter or by centrifugal effect, said precipitate is separated and when the separated precipitate is washed with the same ether, an almost pure chondroitin polysulfate is obtained in the form of a free ester, because it is a generally hygroscopic and strongly acidic substance tending to decompose, it is good to make it as salt by neutralizing the same immediately with a proper base (alkali and alkaline earth hydroxides, alkali and alkaline earth carbonates and organic bases).

Another method of separating the desired product from the reaction mixture includes dissolving the reaction mixture in a great excess amount of cold water or an aqueous solution of an alkaline substance such as an alkali metal hydroxide or carbonate, subsequently separating from said aqueous solution an inorganic sulfuric acid ion existing therein by dialysing or by precipitating it, for instance, as barium sulfate. When the solution removed of an inorganic sulfuric acid ion is concentrated, followed by addition thereto of a non-solvent for the product such as ethanol, the desired product can be recovered. This recovering method of this product is advantageous for separation of the product from the reaction mixture obtained by a process using as small amount as possible of a concentrated sulfuric acid. Thus, according to one specific feature of this invention, chondroitin polysulfate can be produced by mixing chondroitin monosulfate or its salt with 200–400 parts by volume based on 100 parts by weight of chondroitin monosulfate of a liquid reaction medium wherein at least 50% by weight of a concentrated sulfuric acid having a concentration of at least 85% by weight exists at a temperature within the range of from −30° C. to 50° C. to form a viscous paste, maintaining the obtained paste at a temperature within said range, dissolving the obtained reaction mixture in an excess amount of water, removing from said aqueous solution an inorganic sulfuric acid ion existing therein and removing the desired product. The reaction medium may be a concentrated sulfuric acid having a concentration of at least 85% by weight so long as it is liquid at a reaction temperature, or a mixture of the concentrated sulfuric acid and up to 50% by weight of the aliphatic ether mentioned above.

The sulfur content in a sodium salt of chondroitin polysulfate obtained by the process of this invention is very close to a value corresponding to the disulfate (10.6%), trisulfate (13.5%) or tetrasulfate (15.8%). From this fact it is considered that the sulfur content of the product depends upon the reaction conditions, and under certain conditions mainly the disulfate, under other conditions mainly the trisulfate and under still other conditions mainly the tetrasulfate is produced, respectively. And the disulfate obtained by the process of this invention is considered chondroitin-4,6-disulfate. Because, according to an infrared analysis it is known that a disulfate obtained from chondroitin-6-sulfate and a difulfate obtained from chondroitin-4-sulfate have substantially the same structure. This fact further means that the products obtained by the process of this invention have sulfate groups distributed in inner molecular homogeneity. Position of a third sulfate group in chondroitin trisulfate obtained by the process of this invention is considered 2- or 3-position in the D-glucuronic acid moiety. Similarly, positions of a third and a fourth sulfate groups of the tetrasulfate are considered 2-position and 3-position of the D-glucuronic acid moiety.

Another feature of the product obtained by the process of this invention is uniform distribution of sulfur among molecules and homogeneity of molecular weight distribution. When sodium chondroitin polysulfate obtained by the process of this invention is dialyzed, in some case a low molecular weight fraction coming out of the dialyzing film is obtained and in some other case a low molecular weight fraction passing the dialyzing film and a high molecular weight fraction not passing the dialyzing film are obtained. Each of these fractions acts as distinct one component on paper electrophoresis, from which it is understood that each fraction has relatively uniform distribution of molecular weight and sulfur distribution among molecules. These homogeneities can be confirmed by ion exchange chromatography and sephadex column chromatography.

It has been unexpectedly found that the product obtained by the process of this invention has superior blood anti-coagulant activity in vitro and in vivo and a lower toxicity as compared with the product having substantially the same sulfur content and average molecular weight obtained by the conventional process (a sulfating process by pyrodine-$ClSO_3H$).

Next, this invention will be explained in detail with reference to examples. However, it should be understood that this invention will not be limited by these examples.

EXAMPLE 1

Fifty milliliters of a commercially available reagent, firstclass concentrated sulfuric acid (concentration being at least 95%) were cooled to a temperature of 4–5° C., to which 5 grams of sodium chondroitin-6-sulfate (average molecular weight: 67,200) were added and dissolved and the mixture was reacted at the same temperature for 1 hour with stirring. Next, while the reaction mixture was maintained at a temperature of from −5° C. to 0° C., 250 milliliters of ethyl ether were added thereto to precipitate the reaction product. When the precipitate was filtered by a glass filter and washed with ethyl ether, chondroitin polysulfuric acid was obtained as white hygroscopic powder was dissolved in cold water and pH was made 6.5 by a caustic soda solution, thereafter, using a dialyzing film (commercially available Visking tube 36/32) the solution was dialyzed in distilled water (3 times, 300 milliliters per time, distilled water replaced every 24 hours).

When a liquid inside the dialyzing film was concentrated under a reduced pressure and filtered, the resultant liquid (about 30 milliliters) was added with 150 milliliters of ethanol to separate precipitate, thereafter the precipitate was filtered by a filter and washed with ethanol and ethyl ether, successively, sodium chondroitin polysulfate was obtained in the state of white powder, which powder was dried at 85° C. under a reduced pressure for 2 hours.

Yield: 2.4 grams; sulfur content: 11.35%; average molecular weight (due to end group analysis): 7,010.

A liquid outside the dialyzing film (about 900 milliliters) was added with a barium acetate solution to precipitate an inorganic sulfuric acid ion as barium sulfate and the precipitate was centrifuged, thereafter the supernatant liquid was concentrated under a reduced pressure to make the amount about 30 milliliters. After separating a small amount of impurities by filtering or centrifugation of the concentrated liquid, said liquid was added with 240 milliliters of ethanol to separate precipitate. When the precipitate was filtered by a filter and washed with ethanol and ethyl ether, successively, sodium chondroitin polysulfate was obtained as white powder, which powder was dried at 85 C. under a reduced pressure for 2 hours.

Yield: 1.85 grams; sulfur content: 11.69%; average molecular weight (due to end group analysis): 3,420.

EXAMPLE 2

Fifty milliliters of a commercially available reagent, firstclass concentrated sulfuric acid (concentration being at least 95%) were cooled to a temperature of 4–5° C., to which 5 grams of sodium chondroitin-6-sulfate (average molecular weight: 67,200) were added and dissolved, and the mixture was reacted at said temperature for 4 hours with stirring. Next, while the reaction mixture was maintained at a temperature of from −5° C. to 0° C., 250 milliliters of ethyl ether were added thereto to precipitate the reaction product. When the precipitate was filtered by a glass filter and washed with ethyl ether, chondroitin polysulfuric acid was obtained as greyish white hygroscopic powder. Said powder was dissolved in cold water, pH was made 6.5 by a caustic soda solution, thereafter using a dialyzing film (commercially available Visking tube 36/32), the solution was dialyzed in distilled water (3 times, 300 milliliters per time, distilled water replaced every 24 hours). In a liquid inside the dialyzing film, chondroitin polysulfuric acid did not exist. A liquid outside the dialyzing film (about 900 milliliters) was added with a barium acetate solution to precipitate an inorganic sulfuric acid ion as barium sulfate, after the precipitate was centrifuged the supernatant liquid was concentrated under a reduced pressure to make the amount about 40 milliliters. After removing a small amount of impurities by filtering or centrifugation of the concentrated liquid, when said liquid was added with 300 milliliters of ethanol to separate precipitate, said precipitate was filtered by a filter and washed with ethanol and ethyl ether, successively, sodium chondroitin polysulfate was obtained as white powder, which powder was dried at 85° C. under a reduced pressure for 2 hours.

Yield: 4.1 grams; sulfur content: 15.35%; average molecular weight (due to end group analysis: 2,200.

EXAMPLE 3

One hundred milliliters of a commercially available reagent, first-class concentrated sulfuric acid (concentration being at least 95%) were cooled to a temperature of from −7° C. to −8° C., to which 10 grams of sodium chondroitin-6-sulfate (average molecular weight: 67,200) were added and dissolved, and the mixture was reacted at said temperature for 45 minutes with stirring. Next, while the reaction mixture was maintaintained at a temperature below −5° C., 500 milliliters of ethyl ether were added thereto to precipitate the reaction product. When the precipitate was filtered by a glass filter and washed with ethyl ether, chondroitin polysulfuric acid was obtained as white hygroscopic powder. Said powder was dissolved in cold water, pH was made 6.5 by a caustic soda solution, thereafter using a dialyzing film (commercially available Visking tube 36/32), the aqueous solution was dialyzed in distilled water (3 times, 500 milliliters per time, distilled water replaced every 24 hours).

When a liquid inside the dialyzing film was concentrated under a reduced pressure and filtered, the resultant liquid (about 50 milliliters) was added with 300 milliliters of ethanol to separate precipitate, thereafter the precipitate was filtered by a filter and washed with ethanol and ethyl ether, successively, sodium chondroitin polysulfate was obtained as white powder, which powder was dried at 85° C. under a reduced pressure for 2 hours.

Yield: 7.6 grams; sulfur content: 11.10%; average molecular weight (due to end group analysis): 10,540.

A liquid outside the dialyzing film (1,500 milliliters) was added with a barium acetate solution to precipitate an inorganic sulfuric acid ion as barium sulfate and said sulfate was centrifuged, thereafter the supernatant liquid was concentrated under a reduced pressure to make the amount about 30 milliliters. After removing a small amount of impurities by filtering or centrifugation of the concentrated liquid, when said liquid was added with 250 milliliters of ethanol to separate precipitatae, the precipitate was filtered by a filter and washed with ethanol and ethyl ether, successively, sodium chondroitin polysulfate was obtained as white powder, which powder was dried at 85° C. under a reduction pressure for 2 hours.

Yield: 2.5 grams; sulfur content: 10.28%; average molecular weight (due to end group analysis): 3,360.

EXAMPLE 4

Fifty milliliters of a commercially available reagent, first class concentrated sulfuric acid (concentration being at least 95%) were cooled to a temperature of from −6° C. to −7° C., to which 5 grams of sodium chondroitin-4-sulfate (average molecular weight: 36,970) were added and dissolved, and the mixture was reacted at said temperature for 2 hours with stirring. While the reaction mixture was maintained at a temperature below −5° C. it was added with 250 milliliters of ethyl ether to precipitate the reaction mixture. When the precipitate was filtered by a glass filter and washed with ethyl ether, chondroitin polysulfuric acid was obtained as white hygroscopic powder. Said powder was dissolved in cold water, pH was made 6.5 by caustic soda solution, thereafter using a dialyzing film (commercially available Visking tube 36/32), the aqueous solution was dialyzed in distilled water (3 times, 300 milliliters per time, distilled water replaced at every 24 hours).

When a liquid inside the dialyzing film was concentrated under a reduced pressure and filtered, the resultant liquid (about 30 milliliters) was added with 150 milliliters of ethanol to separate precipitatae, the precipitate was filtered and washed with ethanol and ethyl ether, successively, sodium chondroitin polysulfate was obtained as white powder, which powder was dried at 85° C. under a reduced pressure for 2 hours.

Yield: 3.2 grams; sulfur content: 10.70%; average molecular weight (due to end group analysis): 10,960.

A liquid outside the dialyzing film (900 milliliters) was added with a barium acetate solution to precipitate an inorganic sulfuric acid ion as barium sulfate, which was centrifuged, thereafter the supernatant liquid was concentrated under a reduced pressure to make the amount about 30 milliliters. After removing a small amount of impurities by filtering or centrifugation of the concentrated liquid, when said liquid was added with 250 milliliters of ethanol to separate precipitate, and the precipitate was filtered by a filter and washed with ethanol and ethyl ether, successively, sodium chondroitin polysulfate was obtained as white powder, which powder was dried at 85° C. under a reduced pressure for 2 hours.

Yield: 1.05 grams; sulfur content: 11.05% average molecular weight (due to end group analysis): 4,150.

EXAMPLE 5

Seventy-five milliliters of a commercially available reagent, first-class concentrated sulfuric acid (concentration being at least 95%) was added with 25 milliliters of tetrahydrofuran, thereafter the mixture was cooled by Dry Ice-acetone and the internal temperature was maintained at —30° C., to which mixture 5 grams of sodium chondroitin-6-sulfate (average molecular weight: 67,200) were added, and the mixture was reacted at said temperature for 2 hours with stirring. While the reaction mixture was maintained at —30° C., it was added with 400 milliliters of ethyl ether to precipitate the reaction product. When the precipitate was filtered by a glass filter and washed with ethyl ether, chondroitin polysulfuric acid was obtained as white hygroscopic powder. Said powder was dissolved in cold water and pH was made 6.5 by caustic soda solution, thereafter using a dialyzing film (commercially available Visking tube 36/22), the aqueous solution was dialyzed in distilled water (500 milliliters). In a liquid outside the dialyzing film, there was no chondroitin sulfuric acid.

A liquid inside the dialyzing film was concentrated under a reduced pressure and filtered, the filtered liquid (about 40 milliliters) were added to 200 milliliters of ethanol to separate precipitate, thereafter when the precipitate was washed with ethanol and ethyl ether, successively, sodium chondroitin polysulfate was obtained as white powder, which powder was dried at 85° C. under a reduced pressure for 2 hours.

Yield: 4.1 grams; sulfur content: 9.57%; average molecular weight (due to end group analysis): 48,690.

EXAMPLE 6

Ten milliliters (18.5 grams) of a commercially available reagent, first-class concentrated sulfuric acid was cooled to a temperature below 0° C., and when 5 grams of sodium chondroitin-6-sulfate were added thereto and uniformly mixed, an opaque viscous paste was obtained, which when maintained at a temperature of from 0° C., to —2° C. for 30 minutes became transparent. Said transparent paste was maintained at the same temperature for 30 minutes, thereafter dissolved in a cold 5% NaOH aqueous solution to make said paste an aqueous solution having pH of about 6.5.

Next, by the dialyzing operations mentioned in Example 1 sodium chondroitin polysulfate having an average molecular weight of 10,280 (yield: 2.9 grams, sulfur content: 10,81%) and sodium chondroitin polysulfate having an average molecular weight of 3,110. (Yield: 1.6 grams, sulfur content: 10,89%) were obtained.

What is claimed is:

1. A process for the direct production of chondroitin polysulfate having a relatively uniform distribution of molecular weight and sulfur distribution among molecules by concurrent depolymerization and sulfation which comprises dissolving chondroitin monosulfate or a salt thereof in a liquid reaction medium comprising a concentrated sulfuric acid having a concentration of at least 85% by weight at a temperature within the range of from —30° C. to +50° C., maintaining the obtained solution at a temperature within said range, and recovering from the reaction mixture the desired product in the form of a free ester or a salt thereof.

2. A process described in claim 1, wherein said reaction medium contains up to 50% by weight of an aliphatic ether having up to 8 carbon atoms.

3. A process for the direct production of chondroitin polysulfate having a relatively uniform distribution of molecular weight and sulfur distribution among molecules by concurrent depolymerization and sulfation which comprises dissolving chondroitin monosulfate or an alkali metal salt thereof in a liquid reaction medium comprising a concentrated sulfuric acid having a concentration of at least 85% by weight at a temperature within the range of from —30° C. to +50° C., maintaining the obtained solution at a temperature within said range, adding to the reaction mixture a sufficient amount of an aliphatic ether containing up to 8 carbon atoms whereby producing precipitate of chondroitin polysulfate, and recovering the desired product.

4. A process described in claim 3 wherein said reaction medium contains up to 50% by weight of an aliphatic ether having up to 8 carbon atoms.

5. A process for the direct production of chondroitin polysulfate having a relatively uniform distribution of molecular weight and sulfur distribution among molecules by concurrent depolymerization and sulfation which comprises mixing chondroitin monosulfate or a salt thereof with 200-400 parts by volume per 100 parts by weight of chondroitin monosulfate of a liquid reaction medium containing at least 50% by weight of a concentrated sulfuric acid having a concentration of at least 85% by weight at a temperature within the range of from —30° C. to +50° C. to form a viscous paste, maintaining the obtained paste at a temperature within said range, dissolving the obtained reaction mixture in an excess amount of water, removing from the aqueous solution an inorganic sulfuric acid ion existing therein thereby recovering the desired product.

References Cited

UNITED STATES PATENTS 2,612,498 9/1952 Alburn _____ 260—234
2,638,470 5/1953 Alburn _____ 260—234

LEWIS GOTTS, Primary Examiner.

J. R. BROWN, Assistant Examiner.